(12) United States Patent
Gaudet et al.

(10) Patent No.: US 8,425,639 B2
(45) Date of Patent: Apr. 23, 2013

(54) WIRE SAW SLURRY RECYCLING PROCESS

(75) Inventors: Gregory Gaudet, Neward, IL (US); Steven Grumbine, Aurora, IL (US); Nevin Naguib, Aurora, IL (US); Francois Batllo, Burr Ridge, IL (US)

(73) Assignee: Cabot Microelectronics Corporation, Aurora, IL (US)

(*) Notice: Subject to any disclaimer, the term of this patent is extended or adjusted under 35 U.S.C. 154(b) by 545 days.

(21) Appl. No.: 12/476,073

(22) Filed: Jun. 1, 2009

(65) Prior Publication Data
US 2009/0293369 A1    Dec. 3, 2009

Related U.S. Application Data

(60) Provisional application No. 61/130,371, filed on May 30, 2008.

(51) Int. Cl.
*B24D 3/02* (2006.01)
*C09C 1/68* (2006.01)
*C09K 3/14* (2006.01)

(52) U.S. Cl.
USPC .................. 51/307; 451/36; 451/87; 451/88; 209/17

(58) Field of Classification Search ............ 51/307
See application file for complete search history.

(56) References Cited

U.S. PATENT DOCUMENTS

| | | | | |
|---|---|---|---|---|
| 2,297,628 A * | 9/1942 | McGregor | ............. | 423/202 |
| 3,259,243 A * | 7/1966 | Watson et al. | ............. | 209/166 |
| 3,608,836 A * | 9/1971 | Bryant et al. | ............. | 241/16 |
| 4,086,164 A * | 4/1978 | Noda et al. | ............. | 588/320 |
| 5,799,643 A * | 9/1998 | Miyata et al. | ............. | 209/17 |
| 5,830,369 A * | 11/1998 | Toyama | ............. | 210/773 |
| 5,919,124 A * | 7/1999 | Corlett et al. | ............. | 494/33 |
| 5,928,492 A * | 7/1999 | Corlett et al. | ............. | 205/742 |
| 6,001,265 A * | 12/1999 | Toyama et al. | ............. | 209/5 |
| 6,053,158 A * | 4/2000 | Miyata et al. | ............. | 451/446 |

(Continued)

FOREIGN PATENT DOCUMENTS

| | | | | |
|---|---|---|---|---|
| EP | 791385 A1 * | 8/1997 | | |
| JP | 11012562 A * | 1/1999 | | |

(Continued)

*Primary Examiner* — Kaj K Olsen
*Assistant Examiner* — Ross J Christie
(74) *Attorney, Agent, or Firm* — Thomas E Omholt; Robert J. Ross; Steven D. Weseman

(57) ABSTRACT

The present invention provides a method of recycling a water-based wire saw cutting slurry waste fluid comprising abrasive particles and waste solids in a water-based carrier. The method comprises the steps of (a) separating the waste fluid into a first fraction and a second fraction, the first fraction comprising recovered abrasive particles, and the second fraction comprising waste solids and a portion of the water-based carrier; (b) optionally, separating the second fraction to separate the waste solids from the water-based carrier to form a waste solids portion and a recovered water-based carrier portion; (c) optionally, drying the first fraction from step (a) and separating the resulting dried abrasive particles from smaller waste particles to produce a purified recovered abrasive fraction; and (d) suspending particles of the first fraction from step (a), the purified recovered abrasive fraction from step (c), or both, in a suspending medium comprising at least a portion of the recovered water-based carrier from step (b), to generate a recycled water-based wire saw cutting slurry.

8 Claims, 2 Drawing Sheets

U.S. PATENT DOCUMENTS

| | | | | |
|---|---|---|---|---|
| 6,059,712 | A * | 5/2000 | Corlett et al. | 494/33 |
| 6,096,185 | A * | 8/2000 | Corlett et al. | 205/742 |
| 6,113,473 | A * | 9/2000 | Costantini et al. | 451/60 |
| 6,161,533 | A * | 12/2000 | Katsumata et al. | 451/446 |
| 6,322,710 | B1 * | 11/2001 | Katsumata et al. | 210/740 |
| 6,379,538 | B1 * | 4/2002 | Corlett et al. | 210/96.1 |
| 6,482,325 | B1 * | 11/2002 | Corlett et al. | 210/662 |
| 6,615,817 | B2 * | 9/2003 | Horio | 210/166 |
| 6,805,618 | B1 * | 10/2004 | Ward et al. | 451/87 |
| 6,821,437 | B1 * | 11/2004 | Eisner et al. | 210/695 |
| 7,052,599 | B2 * | 5/2006 | Osuda et al. | 210/96.1 |
| 2006/0249134 | A1 * | 11/2006 | Kawasaki et al. | 125/21 |
| 2008/0057833 | A1 * | 3/2008 | Bakshi et al. | 51/298 |
| 2008/0250723 | A1 * | 10/2008 | Fragiacomo | 51/298 |
| 2009/0032006 | A1 * | 2/2009 | Nam et al. | 125/16.02 |

FOREIGN PATENT DOCUMENTS

| | | | |
|---|---|---|---|
| JP | 2000237958 A | * | 9/2000 |
| JP | 2002166363 A | * | 6/2002 |
| JP | 2009196849 A | * | 9/2009 |
| WO | WO 9855200 A1 | * | 12/1998 |
| WO | WO 9965592 A1 | * | 12/1999 |

* cited by examiner

WIRE SAW SLURRY RECYCLING PROCESS

CROSS-REFERENCE TO RELATED PATENT APPLICATIONS

This patent application claims the benefit of U.S. Provisional Patent Application No. 61/130,371, filed May 30, 2008, which is incorporated herein by reference in its entirety.

BACKGROUND OF THE INVENTION

The production of components for applications in the electronic and photovoltaic fields make use of thin silicon disks ("wafers") obtained from either polycrystalline or monocrystalline silicon ingots by cutting (slicing) the ingot perpendicularly to its length. Typically, this slicing operation is carried out by means of a wire saw, in which a moving metal wire of considerable length and suitable mechanical resistance, wound in a system of rollers and spools, is contacted with the ingot perpendicularly to the ingot length, at the points where the cut is to be made. At the same time, a cutting slurry containing abrasive grains or particles (abrasive slurry) is fed to the contact area between the cutter wire and the ingot to aid in cutting the ingot.

The conventional abrasive slurries used for cutting ingots of silicon, quartz or other ceramic material with a wire saw typically comprise a suspending lubricant or cooling fluid in which abrasive particles of suitable hardness are suspended. The suspending fluid typically comprises a mineral oil, or a water-soluble organic liquid, e.g., a high molecular weight polyether such as polyethylene glycol (PEG). The abrasive typically comprises silicon carbide (SiC) or some other high hardness abrasive substance. Water-based slurries (i.e., in which the suspending fluid comprises mainly water) are also known.

During wire sawing of an ingot (e.g., a silicon ingot) with a cutting slurry, the slurry eventually becomes contaminated with particles from the ingot (kerf), and with metal particles from the wire. In addition, some of the abrasive grains in the slurry are broken down into smaller sizes. This combination of contamination with foreign particles and breakdown of the abrasive particles reduces the cutting effectiveness of the slurry.

Used or spent slurry containing kerf particles and degraded abrasives (exhausted or spent slurry) can be discarded; however, the spent slurry contains a large fraction of still usable abrasive grains, which are valuable. A recycling industry has developed to recover and re-use the abrasive from spent cutting slurries. Current recycling processes are designed to handle either oil-based slurries or water-soluble organic liquid-based slurries (e.g., polyethylene glycol-based slurries), collectively referred to herein as "organic-based" cutting fluids. There is an ongoing need to develop an effective recycling process for spent water-based wire saw cutting slurries. The methods of the present invention are designed to address this need.

BRIEF SUMMARY OF THE INVENTION

The present invention provides a method of recycling a water-based wire saw cutting slurry waste fluid comprising abrasive particles and waste solids in an aqueous carrier. The method comprises the steps of (a) providing the water-based wire saw cutting slurry waste fluid, wherein the water content of the aqueous carrier is about 50 wt % or greater, (b) separating the waste fluid into a first fraction and a second fraction, the first fraction comprising recovered abrasive particles, and the second fraction comprising waste solids and a portion of the water-based carrier; (c) optionally, separating the second fraction to separate the waste solids from the water-based carrier to form a waste solids portion and a recovered water-based carrier portion; (d) optionally, drying the first fraction from step (b) and separating the resulting dried abrasive particles from smaller waste particles to produce a purified recovered abrasive fraction; and (e) suspending particles of the first fraction from step (b), the purified recovered abrasive fraction from step (d), or both, in an aqueous suspending medium to generate a recycled water-based wire saw cutting slurry. Step (b) can be performed using a device such as a filtration unit, a centrifuge, a battery of centrifuges, a hydrocyclone, or a battery of hydrocyclones. Optionally, the water-based wire saw cutting slurry waste fluid can be diluted with water prior to step (a). The method can include a preconditioning step prior to step (b), if desired. The preconditioning step comprises adding at least one preconditioning agent selected from the group consisting of oxidizing agents, pH adjusters, coagulants, and surfactants to the waste fluid. In addition, the dried abrasive particles from step (d) can be separated using an apparatus such as a cyclone, a particle classifier, and a grinder classifier.

In another embodiment, the present invention provides a method of recycling a spent water-based wire saw cutting slurry comprising the steps of (a) separating a water-based wire saw cutting slurry waste fluid into a first fraction and a second fraction, the first fraction being enhanced for the recovered abrasive particles, and said second fraction being enhanced for the waste solids and the water-based carrier; (b) optionally, separating the second fraction from step (a) to form a waste solids portion and a recovered water-based carrier portion; (c) drying the first fraction from step (a); (d) separating the resulting dried abrasive particles of step (c) from smaller waste particles to produce a purified recovered abrasive fraction; and (e) suspending particles of the purified recovered abrasive fraction of step (d) in an aqueous suspending medium comprising at least a portion of the recovered water-based carrier portion of step (b) to generate a recycled water-based wire saw cutting slurry. Step (a) can be performed using a device such as a filtration unit, a centrifuge, a battery of centrifuges, a hydrocyclone, or a battery of hydrocyclones. Optionally, the spent water-based wire saw cutting slurry is diluted with water prior to step (a). The method can include a preconditioning step prior to step (a), if desired. The preconditioning step comprises adding at least one preconditioning agent selected from the group consisting of oxidizing agents, pH adjusters, coagulants, and surfactants to the waste fluid. The dried abrasive particles from step (c) can be separated in step (d) using an apparatus such as a cyclone, a particle classifier, and a grinder classifier.

In yet another embodiment, the present invention provides a method of recycling a water-based wire saw cutting slurry waste fluid comprising abrasive particles and waste solids in a water-based carrier, the process comprising the steps of: (a) separating the water-based wire saw cutting slurry waste fluid into a first fraction and a second fraction, the first fraction being enhanced for the recovered abrasive particles, and the second fraction being enhanced for the waste solids and said water-based carrier; (b) optionally, separating the second fraction from step (a) to form a waste solids portion and a recovered water-based carrier portion; and (c) suspending particles from the first fraction of step (a) in an aqueous suspending medium to generate a recycled water-based wire saw cutting slurry. The suspending medium can comprise at least a portion of the recovered water-based carrier portion from step (b). Step (a) can be performed using a device such as a filtration unit, a centrifuge, a battery of centrifuges, a hydrocyclone, or a battery of hydrocyclones. Optionally, the spent water-based wire saw cutting slurry is diluted with water prior to step (a). The method can include a preconditioning step prior to step (a), if desired. The preconditioning step comprises adding at least one preconditioning agent selected from the group consisting of oxidizing agents, pH adjusters, coagulants, and surfactants to the waste fluid.

In another aspect, the present invention provides a process for manufacturing a water-based wire saw cutting slurry. The process comprises the steps of (a) separating a water-based wire saw cutting slurry waste fluid into a first fraction and a second fraction, wherein the waste fluid contains abrasive particles and waste solids suspended in an aqueous carrier comprising at least 50 wt % water and at least 1 wt % of a polymer having an average molecular weight of at least about 2000 Da; the first fraction comprising recovered abrasive particles, and the second fraction comprising waste solids and a portion of the aqueous carrier; (b) suspending at least a portion of the abrasive particles from the first fraction in an aqueous medium at a predetermined concentration of abrasive particles; and (c) adding a polymer having an average molecular weight of at least about 2000 Da to the suspended particles from step (b), to generate a recycled water-based wire saw cutting slurry. Optionally, the process further comprises a preconditioning step prior to step (a), the preconditioning step comprising adding at least one preconditioning agent selected from the group consisting of oxidizing agents, pH adjusters, coagulants, and surfactants to the waste fluid.

In this embodiment, step (a) can be performed using at least one device selected from the group consisting of a filtration unit, a centrifuge, a battery of centrifuges, a hydrocyclone, and a battery of hydrocyclones, if desired. In a preferred embodiment, step (a) is performed in at least three passes through a hydrocyclone.

Preferably, the waste fluid has a Brookfield viscosity in the range of about 5 to about 100 centiPoise during separation, more preferably less than about 50 centiPoise during separation. Water can be added to dilute the waste fluid at any point during the process.

Optionally, the process can include the additional step of drying the first fraction from step (a) and separating the resulting dried abrasive particles from smaller waste particles to produce a purified recovered abrasive fraction; and suspending at least a portion of the purified recovered abrasive fraction in the aqueous medium to generate the recycled water-based wire saw cutting slurry. The dried abrasive particles can be separated using one or more apparatus selected from the group consisting of a cyclone, a particle classifier, and a grinder classifier. In addition, the concentration of abrasive particles in the recycled cutting slurry can be adjusted to a predetermined target level in response to a measurement of the abrasive concentration during the process.

DETAILED DESCRIPTION OF PREFERRED EMBODIMENTS

Figure 1:
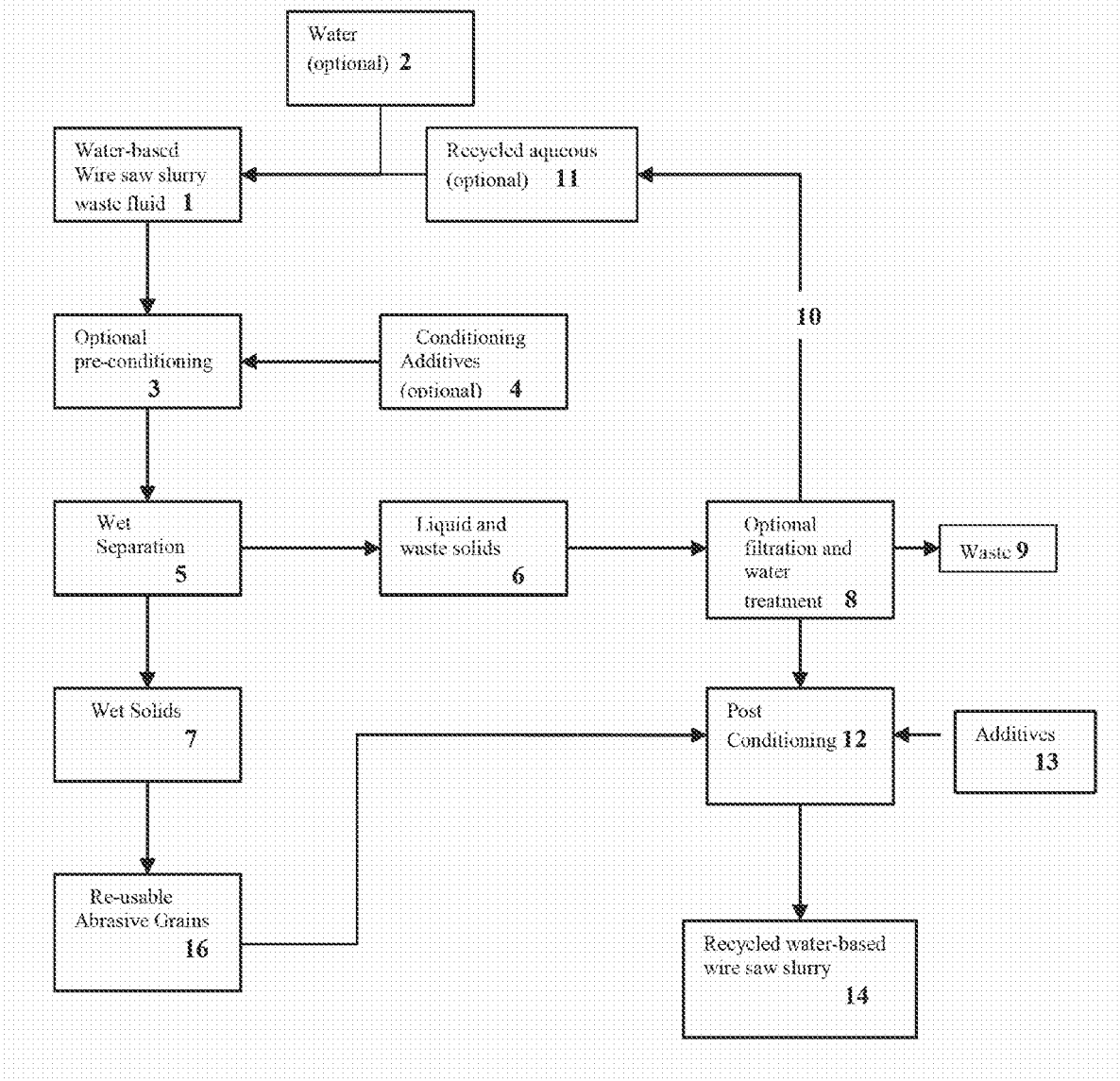
FIG. 1 is a process flow diagram showing one example of the wet separation process.

The present invention provides a process for recycling a spent water-based abrasive slurry following a wire saw cutting process. As used herein, the term "water-based wire saw cutting slurry waste fluid" refers to a recovered water-based cutting slurry that has been previously utilized in a wire sawing process, and includes one or more contaminants such as kerf, metal particles, degraded abrasives, and the like, as well as additional water or processing additives and the like. The process of the present invention provides a simple, relatively low cost method of recovering still usable abrasive grains from water-based cutting slurries, compared to recycling of conventional oil-based and water-soluble organic-based abrasive slurry formulations. In particular, the present invention utilizes fewer and/or simpler process steps compared to recycling processes of conventional oil-based and water-soluble organic-based abrasive slurries. In addition, water-based formulations are amenable to modifying the viscosity and suspension characteristics of the formulation before and after recycling, making the separation of useful abrasives from contaminants more efficient. The methods of the present invention make the use of water-based cutting slurries more practical, which also results in lower environmental impact, through a reduced use of organic components, and therefore, lower organic content in the waste generated, as compared to conventional organic-based fluids.

The present invention provides a method for recycling the spent product of any water-based wire saw cutting slurry. Any suitable water-based wire saw cutting slurry waste fluid can be recycled or reconstituted using the methods of the present invention. Preferred water-based wire saw cutting slurries comprise abrasive particles suspended in a water-based carrier. Examples of preferred water-based wire saw cutting slurry formulations are described in U.S. patent applications Ser. No. 11/888,264 and Ser. No. 12/317,254, which are incorporated by reference in their entirety. The term water-based wire saw cutting slurry waste fluid collectively refers to all components of the feed stock or starting material for the methods of the present invention, i.e., spent water-based cutting slurry recovered from a cutting operation, as well as any added materials such as dilution water, processing additives or aids, and the like. The water-based wire saw cutting slurry waste fluid, therefore, contains a solid fraction comprising useful abrasive grains and waste solids, and an aqueous carrier fraction comprising dissolved components and water.

The water-based wire saw cutting slurry waste fluids recycled in the methods of the present invention comprise abrasive grains and waste products from the cutting process suspended in an aqueous carrier. Waste solids include kerf, or dust from the substrate ingot that was cut with the slurry, as well as metal particles from the cutting wire, and generally also includes size-degraded abrasive particles. Examples of substrates cut in wire saw cutting processes include silicon, sapphire, GaAs, InP and silicon carbide. Therefore, examples of waste solids would include kerf or dust from silicon, sapphire, GaAs, InP and/or silicon carbide. Other waste products can include degraded organic or inorganic additive materials present in the water-based carrier, such as degraded surfactants, dispersants, viscosity modifiers, pH adjustors, corrosion inhibitors, chelating agents, and the like. Waste products include any small particles or molecules produced during the wire saw operation, and typically deemed deleterious if not removed from the slurry when recycled in further wire saw cutting operations.

The water-based wire saw cutting slurry waste fluids can contain any suitable amount of water. For example, the water-based wire saw cutting slurry waste fluids typically contain more than 33% by weight (wt %) of water, preferably more than 50 wt % of water, preferably more than 60 wt % of water, preferably more than 70 wt % of water, preferably more than 80 wt %, preferably more than 90 wt % of water.

The water-based wire saw cutting slurry waste fluids additionally can contain dissolved or emulsified additives. The additives include, without limitation, surfactants, viscosity modifiers, biocides, antifoaming agents, and corrosion inhibitors. The additives are components of the wire saw cutting slurry which improve performance of the cutting, and/or aid in stability properties of the slurry. Preferably, the additives do not contain a significant amount of solid particles, such as bentonite clay, that would interfere with the separation steps of the methods of the present invention. Because some additives, or breakdown products of the additives, may interfere with the inventive recycling process, such additives in the water-based wire saw cutting slurry waste fluids can be neutralized, if desired, during practice of the inventive recycling methods. The term "neutralized" and grammatical variations thereof, refers to a process in which the interfering additive is altered or broken down, such that the additive no longer is capable of interfering with the inventive recycling process. Some examples of neutralizing an additive include, without limitation, oxidation, pH adjustment, increasing surface tension, coagulation or decomposition.

In a preferred embodiment of the invention, the water-based wire saw cutting slurry waste fluid contains a polymer as an additive. Preferably, the polymer is a thickening agent or viscosity modifier. The polymer may also provide improved dispersibility of the abrasive particles, such as SiC, or of the waste materials from the cutting process, such as kerf. The polymer may be of any suitable average molecular weight. Preferably, the polymer has an average molecular weight of greater than about 2000 Da. Preferably, the polymer comprises about 0.2 to about 20% by weight of the aqueous portion of the water-based wire saw cutting slurry waste fluid.

Preferred polymers include, without limitation, non-ionic polymers selected from the group consisting of (a) a polysaccharide, which can be optionally substituted with at least one alkyl group (e.g., methyl, ethyl, propyl, $C_4$-$C_{20}$ alkyl, etc.), hydroxyalkyl group (e.g., hydroxymethyl, hydroxyethyl, hydroxypropyl, etc.), alkoxyalkyl group (e.g., methoxymethyl, methoxyethyl, methoxypropyl, ethoxymethyl, ethoxyethyl, ethoxypropyl, etc.), or a combination of two or more such groups (e.g., cetyl hydroxyethyl, methyl hydroxypropyl, etc.); (b) a polyvinylpyrrolidone, (c) a polyvinylalcohol, and (d) a combination of two or more of the foregoing. Preferably the polymer is a viscosity modifier, and comprises a polysaccharide or a polysaccharide that is substituted with at least one substituent selected from the group consisting of an alkyl group, a hydroxyalkyl group, and an alkoxyalkyl group. Preferred polysaccharides include, without limitation, xanthan gums, guar gums, a starches, cellulose, and a combination of two or more of the foregoing.

The water-based wire saw cutting slurry waste fluids contain abrasive particles that assist in the cutting operation and generally are harder (have a higher hardness) than the substrate material to be cut. Examples of abrasive particles include silicon carbide, diamond and boron carbide, and the like. Preferably, the abrasive particles in the water-based wire saw cutting slurry waste fluid utilized in the methods of the present invention comprise silicon carbide.

FIG. 1 illustrates a process flow diagram of one embodiment of the present invention describing a process for recycling of a water-based wire saw cutting slurry waste fluid using wet separation technology. The incoming water-based wire saw cutting slurry waste fluid (1) optionally is diluted with water (2) to reduce the viscosity and make the downstream process steps more efficient. It is preferred that the water-based wire saw cutting slurry waste fluid have an aqueous carrier fraction (excluding abrasives and solid waste products) of about 50 wt % water or greater (e.g., about 60% or greater, about 75% or greater, about 85% or greater). In contrast to conventional processes of recovering conventional wire saw cutting slurry formulations, which are based on mineral oils or glycols, the higher water content in the aqueous fraction of the waste fluid of the instant invention does not create a separation problem in the downstream process. The incoming water-based wire saw cutting slurry waste fluid optionally be can neutralized in a pre-conditioning step (3) by adding chemical conditioning agents to affect the viscosity (4) and/or to affect the proclivity of the silicon kerf particles to agglomerate with the abrasive grains. Examples of useful neutralizing additives include, but are not limited to, oxidants, pH adjusters, coagulants, and surfactants. In one embodiment, bleach or peroxides can be used to neutralize the surfactants and/or viscosity modifiers in the water-based slurry, thus making the downstream separation steps more efficient. This optional pre-conditioning step (3) of the inventive process is not useful when recycling conventional oil-based or glycol-based recovered wire saw cutting slurries, because the mechanism of abrasive grain suspension is different.

After the optional pre-conditioning step, a wet separation step (5) is performed. The wet separation step can utilize numerous different separation techniques and equipment, such as filtration, density-based techniques such as centrifugation using one or more centrifuges, or hydrocyclones, or any combination of such techniques and devices. Preferably, this step is done by a density-based technique. This process step creates two fractions, a first fraction that contains a large fraction of the reusable abrasive grains (7), and a second fraction that contains the waste products (6), for example, silicon kerf, silicon dust, and metal particles from the wire.

The bulk of the water, together with the small size portion of the particulates (e.g., eroded SiC, kerf and metal particles) are present in the second fraction. At least a small amount of water is preferentially left in the first fraction to prevent the abrasive particles from forming a hard aggregate or "cake". The second fraction is further filtered (8) to remove the waste products, generating a stream that is mostly waste sludge (9). The resulting water fraction optionally can be subjected to conventional waste water treatment steps, and is then available to dilute incoming waste fluid (10), or to produce new abrasive slurry (11). Optionally, the silicon kerf can be further separated out of the filtered portion of the second fraction by a combination of the separation techniques referred to above and recycled as raw materials for the confection of new silicon ingots (not shown in FIG. 1).

The first fraction, which contains the reusable abrasive grains (16), is then processed in a post-conditioning step (12) to reconstitute a recycled water-based wire saw cutting slurry (14). In this step, predetermined amounts of the individual additive components, excluding the abrasive particles, of the original water-based wire saw cutting slurry formulation are added (13). During this step, the water component can include water recovered from process step (8) in addition to water from another source. It is preferred that the abrasive remains wet.

The location of the process steps with relation to the wire saw cutting process can also be a distinguishing feature of this invention. The dilution and wet separation process steps can be done near the wire saw cutting operation. In particular, a hydrocyclone separation is relatively inexpensive, requires a relatively small footprint and could be done in the same plant site or in close proximity (e.g., within about 1 mile) or even attached to the wire saw tool. Conventional recycling typically requires large and costly separation processes to purify the recovered solvent (e.g. PEG or cutting oil) and is typically not done in close proximity to the wire saw cutting process.

A preferred embodiment of this process includes the use of water-based wire saw cutting slurry waste fluids wherein the aqueous carrier fraction contains at least 65 wt % of water, preferably more than 75 wt %, most preferably more than 85 wt % of water. This waste fluid is passed through a series of at least 2 hydrocyclones (e.g., 2 or more, 3 or more) to create two fractions, a first fraction that contains a large fraction of the reusable abrasive grains, and a second fraction that contains the waste products. Optionally, the first fraction is further concentrated in abrasive content by any suitable technique, for example filtering. It is preferred that the abrasive concentration after concentrating is about 65 wt % or more. It is preferred that distillation is not used to concentrate the abrasive as that could degrade some of the organic components, add costs and concentrate the soluble impurities. It is also preferred that the abrasive grains remain moist (e.g., at least 5 wt % of water, preferably more than 20 wt % water, or between 5 wt % and 35 wt % water). This process provides reusable abrasive grains that have low Si and Fe impurity levels. These abrasive grains can be incorporated with a thickener (preferably a polymer) or other additives to regenerate a water-based wire saw cutting slurry.

Figure 2:
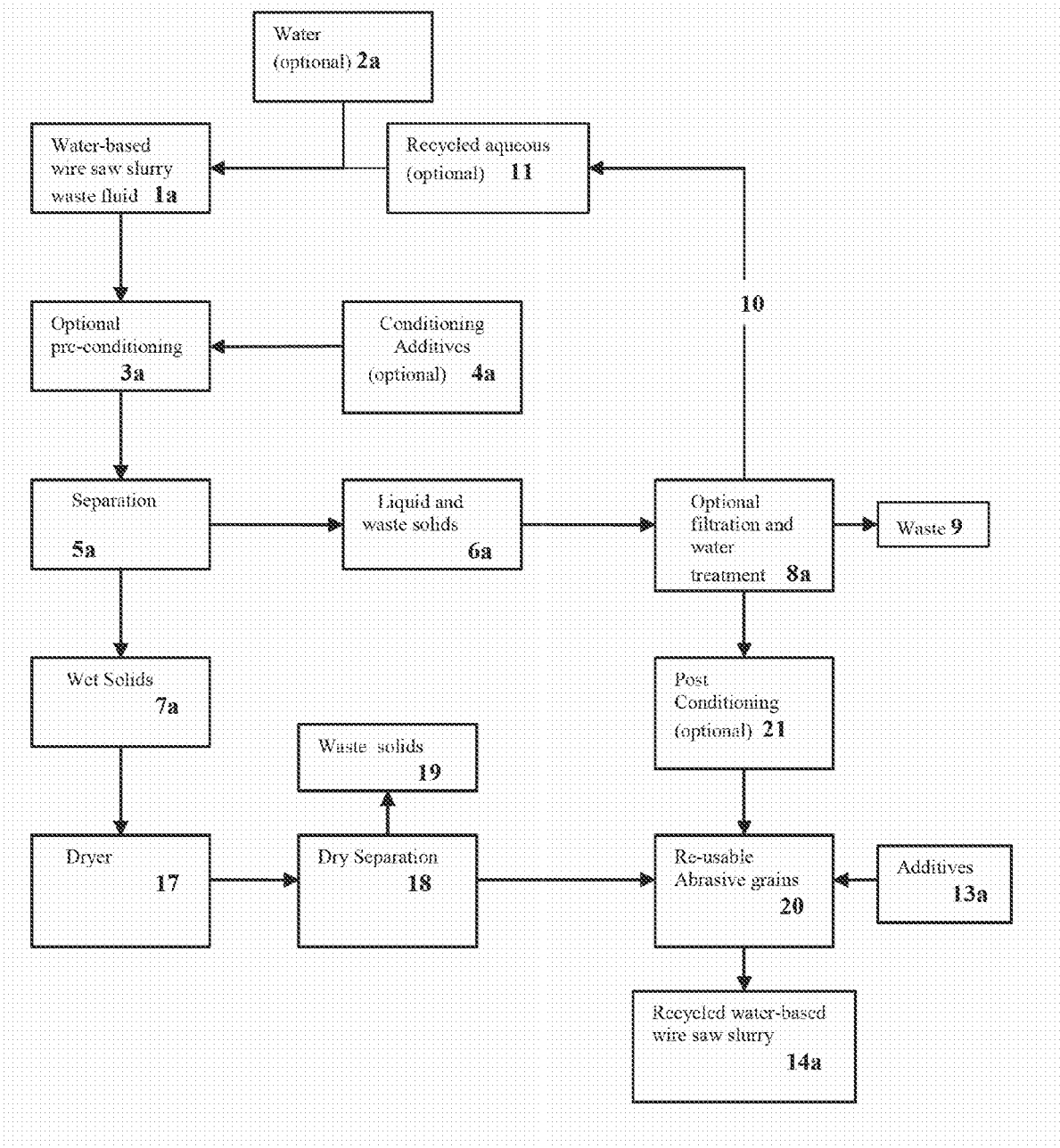
FIG. 2 is a process flow diagram showing one example of the dry separation process.

A second embodiment of the present invention is depicted in the process flow diagram shown in FIG. 2. In this embodiment, a dry separation technique is used to separate the desirable abrasive particles from waste particles. The incoming water-based wire saw cutting slurry waste fluid (1a) is optionally pre-conditioned (3a) as described above for the wet separation process. The pre-conditioned waste fluid is then subjected to a separation step (5a). This separation step can involve filtration and/or centrifugation processes. This step creates a first fraction and a second fraction. The second fraction (6a) containing essentially liquids (mostly water), with little or no solids. The first fraction (7a) contains essentially all of the solids with a very small amount of the liquids. The second fraction can optionally be further filtered (8a) and treated to be reused (10a).

The first fraction containing the abrasive particles is washed, if necessary, to remove dissolved solids remaining on the particles, and then dried (17) to remove essentially all of the liquids. These dried solids are then classified or sorted using dry classification and size sorting technology (18). Examples of conventional dry classification and size sorting technology may include, without limitation, equipment such as cyclones, classifiers and grinder classifiers. Any number or combination of these devices can be used to effect the dry separation. This process step creates a waste solids stream (19) and a stream containing reusable abrasive grains (20). Reusable abrasive grains in stream (20) are then further processed in a post-conditioning step (21) to prepare or reconstitute a recycled water-based wire saw cutting slurry (14a). In this step, predetermined amounts of the individual additive components, excluding the abrasive particles, of the original water-based wire saw cutting slurry formulation are added (13a). During this step, the water (10a) component can include water recovered from the process step (8a,) in addition to water from another source.

The embodiments of the inventive process illustrated in FIGS. 1 and 2, and as described herein, represent several improvements over current technology. In comparison to conventional slurry formulations based on mineral oil or polyethylene glycol (PEG), all of process steps to recondition and reuse this fluid are eliminated. For the wet separation approach shown in FIG. 1, the prior art steps of heating the slurry to reduce its viscosity are eliminated. Additionally, an initial centrifugation or filtration step to remove the solids from the PEG, as required by the prior art, is eliminated by the present invention. For a dry separation approach taught in the prior art, water is often used to reduce the viscosity of the PEG-based slurry prior to solid/liquid separation. This added water is then required to be removed by distillation. In contrast, the process of the present invention eliminates this costly distillation step.

The following examples further illustrate the invention but, of course, should not be construed as in any way limiting its scope.

COMPARATIVE EXAMPLE

Conventional organic-based (e.g., PEG-based) spent slurries, usually containing about 45 wt % SiC abrasive particles and about 10 wt % Si kerf particles are typically processed at silicon wafering plants through a two-stage centrifuge recycling system. The first stage is typically operated at relatively low rotational speed, and is designed to capture the abrasive particles for re-use, while the second stage is typically operated at relatively high rotational speed to remove the smaller kerf particles, leaving relatively clean PEG carrier for re-use. Under normal operating conditions, typically less than 80% of the SiC abrasive from the incoming stream is recovered in the centrifuge underflow, and often less than 70% is recovered. This recovered abrasive often still contains more than 10% of Si kerf particles, sometimes more than 20% of Si kerf particles. In other words, 20% to 30% or more of the SiC abrasive is lost to the waste stream, and at the same time less than 80% of the undesirable Si kerf is removed. This remaining kerf decreases the useful life of the recovered abrasive. Increasing the rotational speed of the first stage centrifuge can increase the SiC abrasive recovery to 80% or above, but the Si kerf remaining in recovered abrasive also generally increases to above 20%. Accordingly, the typical process variables available in the first stage of a conventional 2-stage centrifugal slurry recycling system cannot break the trade-off between SiC abrasive recovery and Si kerf in remaining in the recovered abrasive.

Example 1

In contrast, water-based wire saw cutting slurry waste fluid containing about 45 wt % SiC abrasive particles and about 10 wt % Si kerf particles can be processed on the same centrifuge system as described in the comparative example. The aqueous carrier fraction of this waste fluid generally contains greater than 85 wt % water. Prior to processing, the water content of water-based wire saw cutting slurry waste fluid can be adjusted by adding water. For example, the waste fluid may be diluted with sufficient water to bring the water content of the aqueous carrier of the waste fluid to the desired range. When the first stage centrifuge of the two-stage system is operated under the same normal conditions as described in the comparative example, generally more than 85% of the SiC abrasive will be recovered in the centrifuge underflow, with less than 20% of Si kerf remaining in the recovered abrasive. A higher water content in the waste fluid will generally lead to increased abrasive recovery, and to lower Si kerf remaining in the recovered abrasive. Note that dilution of conventional PEG-based slurries with water is possible, but creates additional processing problems and expense. For example, since it is usually desirable to recover the PEG for re-use, removing the added water requires additional distillation and purification steps.

The underflow from the first centrifugation step can be diluted with water and processed a second time through the first stage centrifuge using the same operating conditions. After the second processing, generally 80% or more of the starting SiC will be recovered, and the Si kerf remaining in the recovered abrasive will be reduced to about 5% or less. Thus, the use of water dilution changes the trade-off between SiC abrasive recovery and undesirable Si kerf remaining in the abrasive, as with conventional processes. In addition, the water dilution and centrifugation can be repeated, so that the Si kerf remaining in the abrasive can be even further reduced.

It will be clear to those of ordinary skill in the art that other combinations of dilution ratio and/or number of stages of centrifuge processing can be used to achieve the desired combination of abrasive recovery and Si kerf remaining, while optimizing the total cost of processing. It will also be clear to those of ordinary skill in the art that other devices including but not limited to hydrocyclones can be used to separate the re-usable abrasive particles from the waste materials.

Example 2

A water-based wire saw cutting slurry waste fluid of the type used in Example 1 was processed in a pilot scale hydrocyclone (1" diameter, Flo-Trend Systems Inc., Houston, Tex.). The starting solids concentration of the waste slurry was 12 wt %. The processing rate was about 5 gallons per minute (gpm), and the overflow and underflow were captured separately. After the first processing step, the collected overflow was processed through the hydrocyclone a $2^{nd}$, $3^{rd}$ and $4^{th}$ time. That is, the overflow from the first processing step became the inflow for the $2^{nd}$ processing step, and so forth. This mode of operation simulates a battery of hydrocyclones connected in series, with the overflow from the first hydrocyclone feeding the second hydrocyclone, and so forth.

Solids concentration and particle sizes were measured for each processing step, as shown in Table 1.

TABLE 1

| | Mean Particle Size (micrometers) | | | |
|---|---|---|---|---|
| | Solids (wt %) | Inlet | Overflow | Underflow |
| $1^{st}$ Step | 12.0 | 10.8 | 9.6 | 12.4 |
| $2^{nd}$ Step | 7.2 | 9.4 | 8.3 | 11.4 |
| $3^{rd}$ Step | 4.3 | 7.7 | 6.5 | 10.2 |
| $4^{th}$ Step | 2.7 | 6.7 | 5.5 | 9.2 |

There is a small discrepancy between the overflow particle size for each processing step and the inlet particle size for the subsequent processing step, which may be due to measurement error, or to minor amounts of particle settling in the processing tank during processing. This example shows that each processing step for diluted aqueous spent slurry reduces the particle concentration; that is, each step results in a greater total fraction of particles captured to the underflow. Also, each step results in an enrichment of larger particles in the hydrocyclone underflow and an enrichment of smaller particles in the overflow. This example further shows that multiple processing steps (or multiple hydrocyclones connected in series, overflow to inlet) allow smaller abrasive particles to be captured to the underflow, until the remaining abrasive particles in the overflow are no longer desirable to capture. Those of ordinary skill in the art will understand that hydrocyclones of different size or from different manufacturers will have different separation performance, so that more or fewer process steps might be required to achieve the desired level of separation.

Example 3

A water-based wire saw cutting slurry waste fluid of the type used in Example 1 was processed at about 5 gpm in a pilot scale hydrocyclone (1" diameter, Type 28, Encyclon Inc., Kenosha, Wis.). The starting solids concentration of waste fluid was 10.6%. The total waste fluid in the processing tank was about 131 kg, and the inferred particle loading (from waste fluid density) was about 10.6 wt %, or 13.9 kg. The process was operated in such a way that the overflow from the hydrocyclone was returned to the processing tank ("overflow recirculation mode"), while the underflow was collected separately. The density in the tank containing the waste fluid was continuously monitored using a Coriolis meter (Rosemount Micromotion); the particle concentration in the tank can be inferred from this density measurement. Table 2 shows the particle concentration in the tank versus time.

TABLE 2

| Time (min) | Tank Particle Concentration (wt %) |
|---|---|
| 0 | 10.6 |
| 10 | 3.5 |
| 20 | 1.1 |
| 30 | 0.4 |

During the 30 minutes of processing, about 35.7 kg of particle laden slurry containing about 13.4 kg of particles was captured in the underflow. This example shows that a single hydrocyclone, operated in overflow recirculation mode, is effective to capture more than 95% of the particles from the waste fluid in less than 30% of the total waste fluid mass. Those of ordinary skill in the art will understand that greater or lesser processing time will result in greater or lesser particle capture, and that by operating a multi-stage process in this manner, desirable combinations of total particle capture and rejection of smaller particles can be achieved.

Example 4

A water-based wire saw cutting slurry waste fluid of the type used in Example 1 was processed at about 5 gpm in a pilot scale hydrocyclone (1" diameter, Type 28, Encyclon Inc., Kenosha, Wis.). The starting solids concentration was 18.0 wt %. The total waste fluid in the processing tank was about 90 kg, and the inferred particle loading (from fluid density) was about 18.0 wt %, or 16.2 kg. The process was operated in such a way that the overflow from the hydrocyclone was returned to the processing tank ("overflow recirculation mode"), while the underflow was collected separately. The fluid density in the processing tank was continuously monitored using a Coriolis meter (Rosemount Micromotion); the particle concentration in the processing tank can be inferred from this density measurement. Table 3 shows the particle concentration in the tank versus time.

TABLE 3

| Time (min) | Tank Particle Concentration (wt %) |
|---|---|
| 0 | 18.0 |
| 5 | 13.0 |
| 10 | 7.6 |

TABLE 3-continued

| Time (min) | Tank Particle Concentration (wt %) |
|---|---|
| 15 | 4.1 |
| 20 | 2.6 |
| 25 | 1.8 |
| 30 | 1.3 |

During the 30 minutes of processing, about 40.4 kg of particle laden slurry containing about 14.4 kg of particles was captured in the underflow. This example shows that a single hydrocyclone, operated in overflow recirculation mode, is effective to recover more than 85% of the abrasive particles in about 45% of the total waste fluid mass. Those of ordinary skill in the art will understand that greater or lesser processing time will result in greater or lesser particle capture, and that by operating a multi-stage process in this manner, desirable combinations of total particle capture and rejection of smaller particles can be achieved. Comparing this example to Example 3 shows that different dilution levels affect the total capture efficiency of the process, and that dilution level can be used as a parameter to achieve the desired separation.

Example 5

A water-based wire saw cutting slurry waste fluid of the type used in Example 1 was processed in overflow recirculation mode as described in Examples 3 and 4 above. The starting volume was about 200 liters and the starting specific gravity was 1.207 (inferred particle concentration of 24.9 wt %). Processing continued until the specific gravity of the fluid in the recovery tank reached 1.037 (inferred particle concentration of 5.2 wt %). This took about 40 minutes. The captured underflow was then re-diluted with 1.95 volumes of water per volume of captured underflow, and this was processed a $2^{nd}$ time in overflow recirculation mode. The specific gravity at the start of the $2^{nd}$ process step was 1.180 (inferred particle concentration of 22.1 wt %) and processing continued until the specific gravity of the fluid in the recovery tank reached 1.044 (inferred particle concentration of 6.1 wt %). The mean particle sizes from this processing are shown in Table 4.

TABLE 4

| Mean Particle Size (micrometers) | |
|---|---|
| Starting Aqueous Spent Slurry | 13.2 |
| Final Captured Underflow (after $2^{nd}$ step) | 14.1 |
| Remaining Slurry in Processing Tank | 9.7 |

This example shows that a multi-stage process can be used to recycle aqueous spent slurry, and that the larger particles are enriched in the underflow, while the smaller particles are enriched in the overflow.

As described herein, the present invention is capable of reducing processing costs of recycling or recovering slurries in the wire saw cutting process. Obviously, various minor changes and modifications of the present invention are possible in light of the detailed description provided above. Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the description herein as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of recycling a water-based wire saw cutting slurry waste fluid comprising abrasive particles and waste solids in an aqueous carrier, the process comprising the steps of:
   (a) providing the water-based wire saw cutting slurry waste fluid, wherein the aqueous carrier has a water content of about 75 wt. % or greater, a polymer having an average molecular weight of greater than about 2000 Da, and free of at least one preconditioning agent selected from the group consisting of oxidizing agents, pH adjusters, coagulants, and surfactants;
   (b) separating the water-based wire saw cutting slurry waste fluid into a first fraction and a second fraction, the first fraction being enhanced for the abrasive particles, and the second fraction being enhanced for the waste solids and said water-based carrier;

(c) optionally, separating the second fraction from step (b) to form a waste solids portion and a recovered water-based carrier portion; and (d) suspending particles from the first fraction of step (b) in an aqueous suspending medium to generate a recycled water-based wire saw cutting slurry, wherein the process further comprises a preconditioning step prior to step (b), the preconditioning step comprising adding at least one preconditioning agent selected from the group consisting of oxidizing agents, pH adjusters, coagulants, and surfactants to the waste fluid.

2. The method of claim 1, wherein the aqueous suspending medium comprises at least a portion of the recovered water-based carrier portion from step (c).

3. The method of claim 1, wherein step (b) is performed using at least one device selected from the group consisting of a filtration unit, a centrifuge, a battery of centrifuges, a hydrocyclone, and a battery of hydrocyclones.

4. The method of claim 1, wherein the water-based wire saw cutting slurry waste fluid is diluted with water prior to step (a).

5. The method of claim 1, wherein the abrasive particles comprise particles selected from the group consisting of silicon carbide, diamond and boron carbide.

6. The method of claim 1, including the additional step of drying the first fraction from step (b) and separating the resulting dried abrasive particles from smaller waste particles to produce a purified recovered abrasive fraction; and suspending at least a portion of the purified recovered abrasive fraction in the aqueous suspending medium to generate the recycled water-based wire saw cutting slurry.

7. The method of claim 6, wherein the dried abrasive particles are separated using one or more apparatus selected from the group consisting of a cyclone, a particle classifier, and a grinder classifier.

8. A recycled water-based cutting slurry prepared by the method of claim 1.

* * * * *